Oct. 27, 1964  J. A. CLANDININ  3,154,287
KNIFE GATE VALVE
Filed Oct. 3, 1961  2 Sheets-Sheet 1
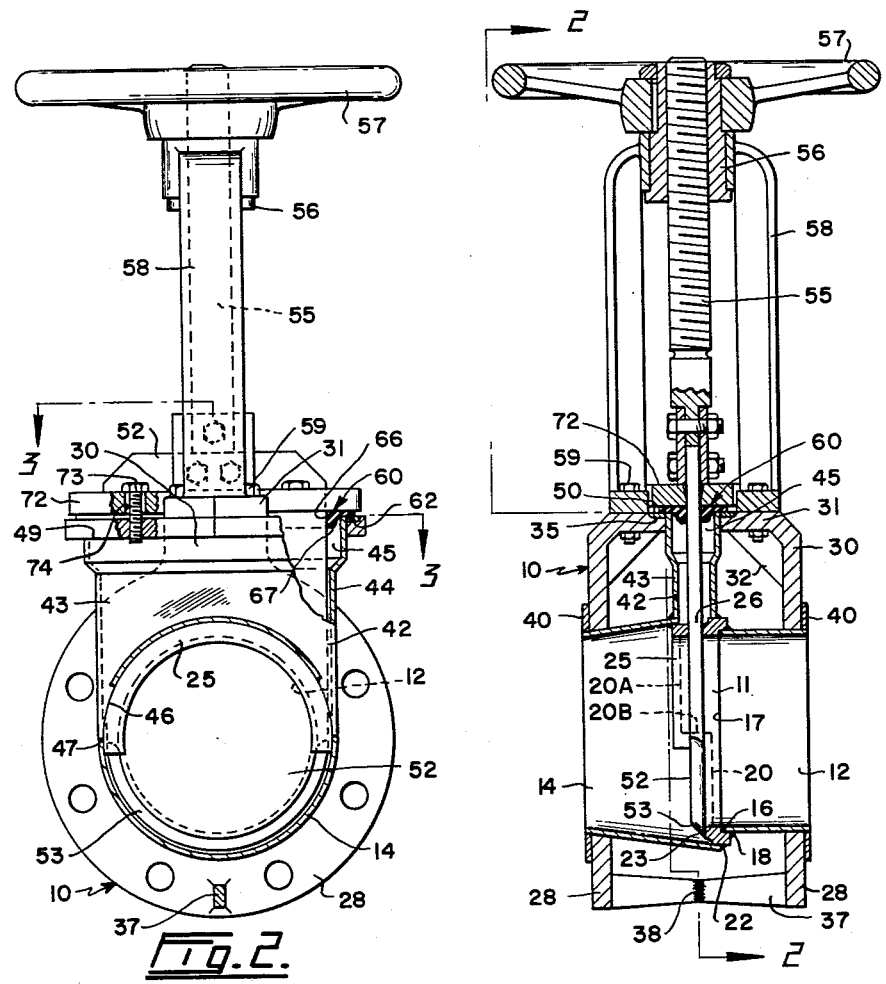
Fig. 1.
Fig. 2.
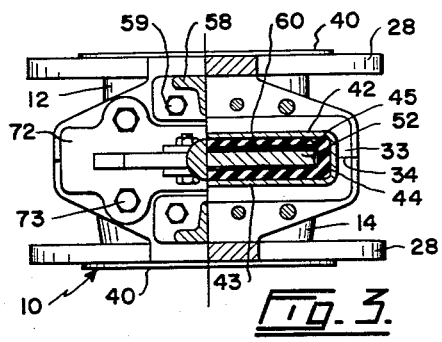
Fig. 3.
INVENTOR
JAMES A. CLANDININ
By Hugo Ray
Agent Oct. 27, 1964  J. A. CLANDININ  3,154,287
KNIFE GATE VALVE
Filed Oct. 3, 1961  2 Sheets-Sheet 2
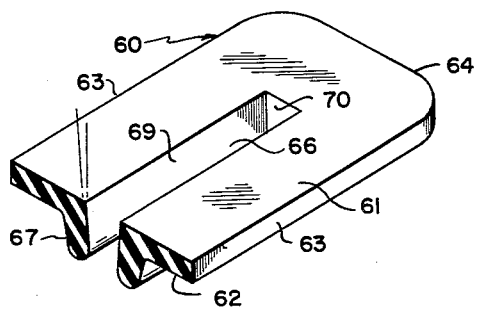
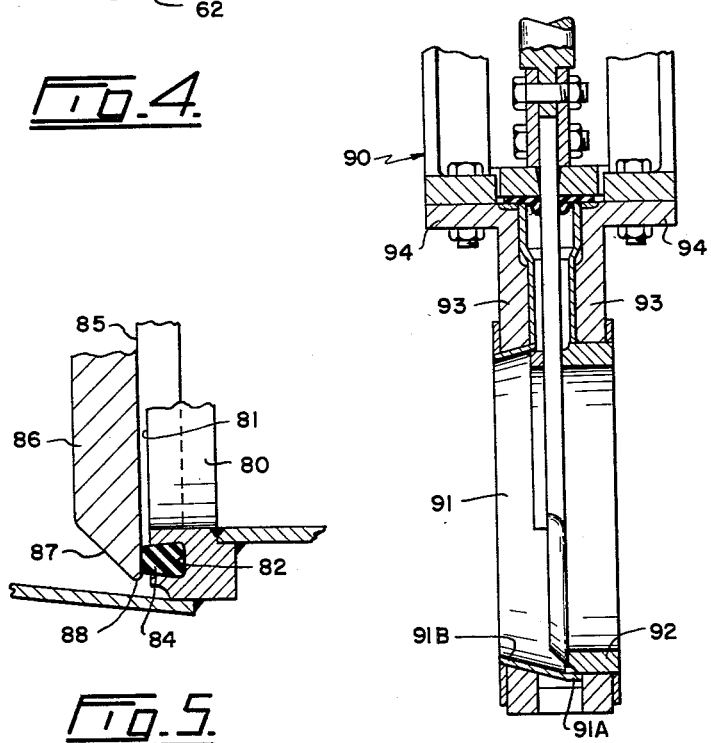
INVENTOR
JAMES A. CLANDININ
By Hugo Ray
Agent

# United States Patent Office 3,154,287
Patented Oct. 27, 1964

3,154,287
KNIFE GATE VALVE
James A. Clandinin, 1020 W. 71st Ave., Vancouver 14,
British Columbia, Canada
Filed Oct. 3, 1961, Ser. No. 142,707
4 Claims. (Cl. 251—214)

The objects of the invention are to provide a valve structure of extremely simple design which can be economically manufactured and assembled and which is easily modified for installation in pulp mills and the like where lack of space makes it difficult to install conventional valves.

A further and important object is to provide sealing means for the valve gate whereby the sealing pressure applied is directly proportional to the fluid pressure in the valve body.

These and other objects will appear in the following specification and be shown in the accompanying drawings.

Referring to the drawings:

FIGURE 1 is a vertical section taken through the centre of the gate valve.

FIGURE 2 is a section taken on the line 2—2 of FIGURE 1.

FIGURE 3 is a sectional plan taken on the line 3—3 of FIGURE 2.

FIGURE 4 is a perspective view showing a section of the valve gasket.

FIGURE 5 is a detail section of a modified form of the seat ring.

FIGURE 6 is a vertical section of a modification of the valve body.

The present knife gate valve has a body generally indicated by the numeral 10 and including a valve seat ring 11, a cylindrical sleeve 12 and a reducing sleeve 14 all of which are preferably fabricated from stainless steel plate. A rebate 16 is formed on the inner periphery of the seat ring to receive the inner edge 17 of the sleeve 12 and those valve body parts are welded together as at 18.

The large diameter end of the reducing sleeve is cut away or stepped to provide parallel and semi-circular edges 20 and 20A on the lower and upper portions of the sleeve respectively and extending between said edges is a horizontal edge 20B. A weld 22 secures the lower edge 20 to the outer periphery of the seat ring so as to leave the inner or sealing face 23 of said ring spaced from, and unobstructed by, the welded sleeve edge. A semi-circular guide 25 is welded to the inner periphery of the reducing sleeve and this guide projects beyond the edge 20A to define with the seat ring 11, a centrally disposed opening 26 into the valve body.

The valve body 10 is provided with bolting flanges 28 which I prefer to make as a steel casting with all openings being cored so that no machining is required. Each flange is annular in form and has a narrow neck 30 and an inwardly directed top plate 31. A centrally disposed web 32 connects the neck 30 and plate 31. As shown in FIGURE 3 the top plate flares outwardly from the neck of the flange and is provided at its ends with prongs 33 which have a horizontal knife edge 34. Along the inner edge of the top plate 31 a recess 35 is formed. The lower edge of the flange 28 is provided with a prong 37 which is vertically aligned with the web 32, and has a vertical knife edge 38.

The flanges 28 are welded to the sleeves 12 and 14 with their knife edges 34 and 38 in abutment with one another and said knife edges are also welded together to form a strong valve body. The outer ends of the sleeves project beyond the adjacent faces of the flanges and facing rings 40 are welded to these projecting ends and to flanges.

Extending between the top plates 31 of the bolting flanges and the aligned sleeves is an envelope 42 which registers with the body opening 26. The envelope has side walls 43 and end walls 44 and the upper part of said envelope is enlarged to provide a rectangular chamber 45. The lower edges 46 of the envelope side walls are semi-circular in form to correspond to the curvature of the sleeve 14 and the seat ring 11 against which they bear. Prior to assembly the reducing sleeve was inserted into a die and the horizontal edges 20B were bent parallel to the longitudinal axis of the valve body. Thus, the lower edges 47 of the end walls 44 are in full contact with the edges 20B and all lower edges of the sleeve are secured to the valve body parts by welding. The horizontal upper edge 49 of the envelope is secured to the opposing edges of the top plates 31 by a weld 50 which is received in and completely fills the recess 35.

The valve is provided with a gate 52 formed of a stainless steel plate and having a semi-circular and beveled lower edge 53. The gate 52 freely extends through the envelope 42 and is supported in sliding and sealing engagement with the face 23 of the seat ring by the guide 25. A slight clearance, say 1/16 of an inch, is provided between the end walls 44 and the adjoining side edges of the gate. Bolted to the upper end of the gate is a spindle 55 which is threaded on its upper portion to receive a nut 56, the said nut being fitted with a handwheel 57. The nut 56 is journalled in the upper end of a yoke 58 which is bolted or otherwise fastened as at 59 to the top plates 31.

Fitted to the gate valve is a gasket 60 which may be of a soft resilient, rubber like material although certain plastics having the required resilience may be used. As shown best in FIG. 4, the gasket consists of a flat strip of deformable material having an upper face 61, a lower face 62, parallel sides 63 and ends 64 which may be rounded as shown in the figure. A centrally disposed rectangular slot 66 extends longitudinally of the gasket and on the lower face of the gasket said slot is bordered by an integral flange 67. The slot 66 has sides 69 and 70 which are plane surfaces and preferably are inclined to a very slight degree so that the slot tapers inwardly from the face 61 to the face 62 of the gasket. The depth of the flange 67 is substantially twice the thickness of the gasket material so that the sides 69 and 70 form relatively broad sealing surfaces.

Referring again to FIGURE 1, the gasket 60 is fitted to the valve with its lower face 62 supported on the welded portion of the plates 31 and with its flange 67 projecting into the chamber 45 of the envelope. The gate 52 slidably extends through the slot 66 with the side and end surfaces of the slot closely fitting the adjoining surfaces of the gate. In this position the gasket is clamped to the valve body by means of a gland plate 72, which is fitted with a number of suitably spaced bolts 73. It will be noted that, as shown in FIGURE 2, the bolts 73 extend through enlarged openings 74 in the gland plate so that said plate may be centrally located with respect to the gate. When the bolts 73 are subsequently tightened only sufficient pressure is applied to clamp the gasket to the top plates and care is taken not to extrude the resilient gasket material into binding contact with the gate. The gate is lightly engaged by the lowermost portions of the side and end surfaces 69 and 70 respectively, thus little or no resistance is offered by the gasket to the opening and closing movement of the gate. By providing sufficient space between the flange 67 and the walls 43 and 44 of the envelope and securing the gasket in position by means of the adjustably mounted gland plate, proper engagement between the gate and the seat is ensured and the valve and seat may be refaced several times during the life of the valve without impairing the seal therebetween.

When the gate is in closed position and fluid under pressure is introduced into the sleeve 14 and allowed to build up against the gate from zero to say, 100 pounds per square inch, then a corresponding increase in pressure will take the place within the envelope 42. This fluid pressure in the chamber 45 compresses the flange 67 so that the surfaces 69 and 70 are held in sealing contact with the corresponding gate surfaces with a force equal to 100 p.s.i. In order words the sealing pressure is directly proportional to the fluid pressure in the line and at no time is the sealing pressure greater than that which is required effectively to prevent fluid from escaping between the gasket and gate.

With the sealing pressure at a minimum at all times, the gate is much easier to raise and lower than the conventional valve wherein said pressure is constant and in accordance with the maximum fluid pressure likely to be encountered. It naturally follows that less wear of the valve parts take place and since the sealing pressure is evenly applied there is no tendency for the gate to be forced out of proper engagement with its seat ring.

In the modification shown in FIGURE 5, the knife gate valve is provided with a seat ring 80 having an inner face 81 in which a groove 82 is machined. The sides of the groove converge towards the face 81 so as to retain within said groove a ring 84. The ring may be formed of a rubber like material similar to the gasket 60 and the ring is made oversize so that a certain amount of deformation is necessary to enter the gasket into the groove. When seated in its groove, the ring 84 projects a short distance beyond the inner face 81 to provide a sealing face 85 which is engaged by the gate 86. The beveled edge 87 of the gate is rounded as at 88 so as to prevent damage to the resilient ring.

A seat ring of this type provides a complete shutoff for the fluid flowing from the sleeve 14 to the sleeve 12. When the installation is such that the valve is required to control fluid flowing through the line in either direction, two such rings 84 are employed. The guide 25 is dispensed with and is replaced by a second ring 84 which is welded to a cylindrical sleeve as previously described. Such an arrangement ensures a 100% shut-off regardless of the direction of fluid flow in the valve line.

A further modification of the valve is shown in FIGURE 6 and this form of the valve is designed for use in installations where there is insufficient space to install the preferred embodiment of the valve. The wafer valve 90 consists of a sleeve 91 having a cylindrical portion 91A and a conical portion 91B. A seat ring 92 is fitted to the portion 91A. Flanges 93 are secured to the sleeve and the seat, which flanges have outwardly turned top plates 94. The remainder of the valve is constructed substantially as previously described and it will be seen that the total length of the body portion of the wafer valve has been reduced to a minimum so that the valve may be installed in a confined space.

What I claim is:

1. A gate valve comprising a body formed of a cylindrical sleeve and a tapered reducing sleeve, a seat ring secured to the inner periphery of the larger end of the reducing sleeve and to the outer periphery of the adjoining inner end of the cylindrical sleeve, said reducing sleeve having a gate receiving opening adjacent the seat ring, an open-ended envelope secured to both the reducing sleeve and the seat ring, a valve gate projecting through the envelope and opening in sliding and sealing engagement with the seat ring, a sealing member having a slot through which the valve gate freely extends and means for securing the sealing member to the valve body.

2. A gate valve as claimed in claim 1, wherein the sealing member has a lower face provided with a flange, said flange bordering the slot, said slot having sides, said flange projecting into the envelope and the sides of the slot being adapted to be moved into sealing engagement with the valve gate solely in response to fluid pressure within the envelope.

3. A gate valve as claimed in claim 1, wherein the slot has sides and the means for securing the sealing member to the valve body is laterally adjustable whereby the sides of the slot are equidistantly spaced from the adjoining faces of the valve gate.

4. A gate valve as claimed in claim 1, wherein a semi-circular valve gate guide is secured to the larger end of the reducing sleeve, the inside diameters of the cylindrical sleeve, the smaller end of the reducing sleeve, the seat ring and the guide being substantially equal.

References Cited in the file of this patent

UNITED STATES PATENTS

| | | |
|---|---|---|
| 1,751,122 | Barker | Mar. 18, 1930 |
| 2,720,379 | Williams | Oct. 11, 1955 |
| 3,000,608 | Williams | Sept. 19, 1961 |

FOREIGN PATENTS

| | | |
|---|---|---|
| 320,744 | Great Britain | Oct. 24, 1929 |